United States Patent [19]
Ando et al.

[11] Patent Number: 4,652,009
[45] Date of Patent: Mar. 24, 1987

[54] REAR SUSPENSION SYSTEM FOR VEHICLE

[75] Inventors: Fumitaka Ando; Kijima Takao, both of Hiroshima, Japan

[73] Assignee: Mazda Motor Corporation, Hiroshima, Japan

[21] Appl. No.: 758,880

[22] Filed: Jul. 25, 1985

[30] Foreign Application Priority Data

| Jul. 31, 1984 | [JP] | Japan | 59-160350 |
| Jul. 31, 1984 | [JP] | Japan | 59-160351 |
| Jul. 31, 1984 | [JP] | Japan | 59-160352 |
| Jul. 31, 1984 | [JP] | Japan | 59-160353 |
| Aug. 6, 1984 | [JP] | Japan | 59-120774[U] |

[51] Int. Cl.$^4$ ............................................. B60G 11/16
[52] U.S. Cl. ............................ 280/701; 267/20 A; 280/724
[58] Field of Search .............. 280/701, 664, 724; 180/299, 312, 215; 267/20 A

[56] References Cited

U.S. PATENT DOCUMENTS

| 3,871,467 | 3/1975 | Senft et al. | 280/701 |
| 3,891,232 | 6/1975 | Flemming | 280/701 |
| 3,894,602 | 7/1975 | Von Der Ohe | 280/664 |
| 4,257,623 | 3/1981 | Kawase et al. | 280/701 |
| 4,377,218 | 3/1983 | Fukushima | 180/312 |
| 4,392,667 | 7/1983 | Shakespear | 280/701 |
| 4,424,984 | 1/1984 | Shiratori et al. | 280/701 |
| 4,526,400 | 7/1985 | Kijima et al. | 280/701 |
| 4,531,606 | 7/1985 | Watanabe | 180/215 |

FOREIGN PATENT DOCUMENTS 2054556  8/1971  Fed. Rep. of Germany ...... 280/701

Primary Examiner—David M. Mitchell
Assistant Examiner—Kenneth R. Rice
Attorney, Agent, or Firm—Gerald J. Ferguson, Jr.; Michael P. Hoffman; Ronni S. Malamud

[57] ABSTRACT

In a rear suspension system, a suspension mounting frame extends in the transverse direction of the vehicle body and is supported on the vehicle body at the right and left ends thereof by way of resilient material bodies. A pair of trailing arms pivoted on the suspension mounting frame. An intermediate portion of the suspension mounting frame is connected, by way of a resilient material body, to a front portion of a differential case which is connected to the vehicle body at a rear portion by way of a resilient material body. Further, the intermediate portion of the suspension mounting frame is supported by the vehicle body by way of a vertical movement restraining member.

12 Claims, 8 Drawing Figures

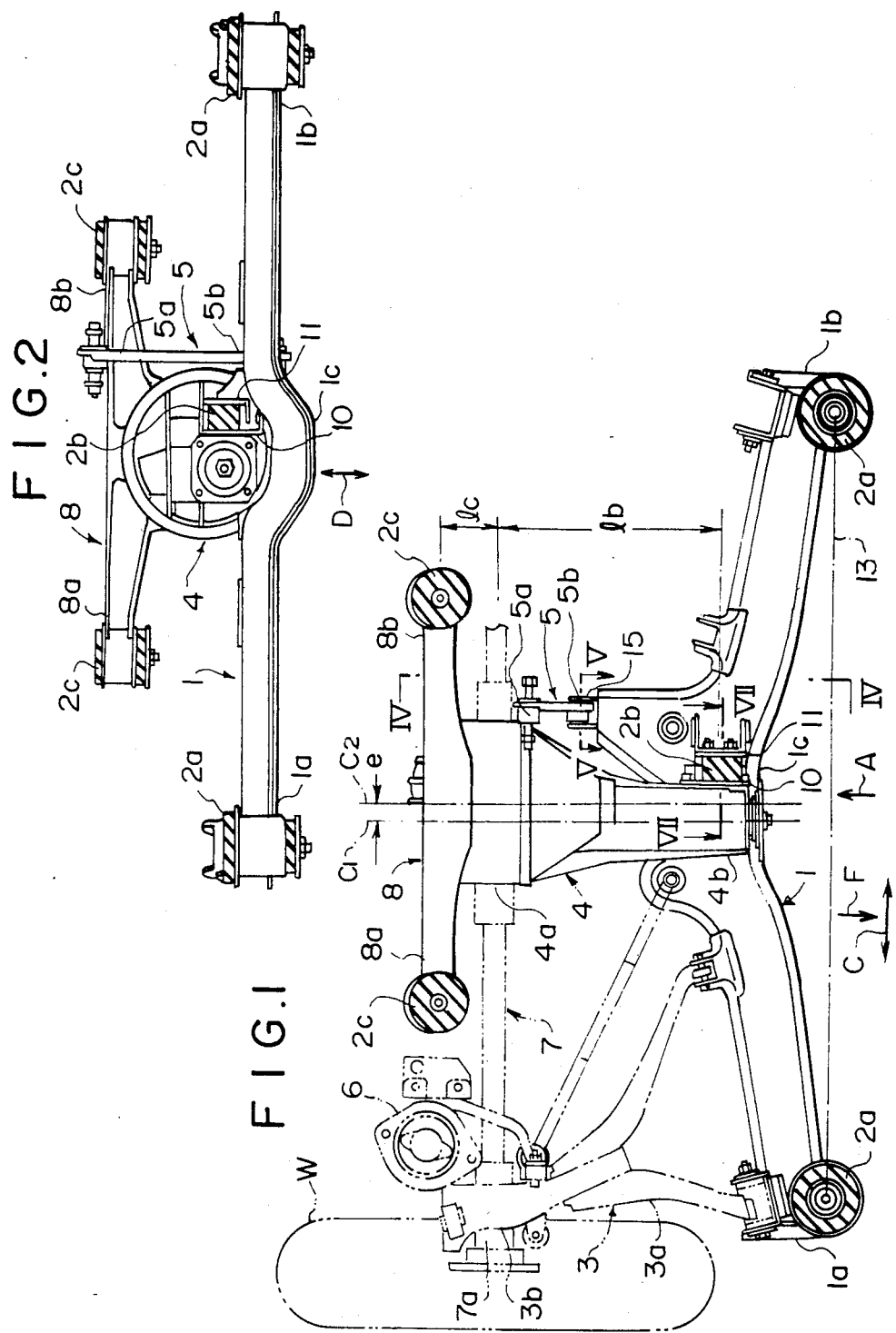

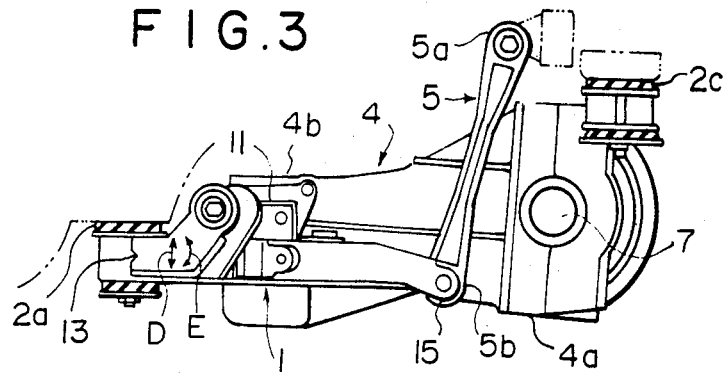
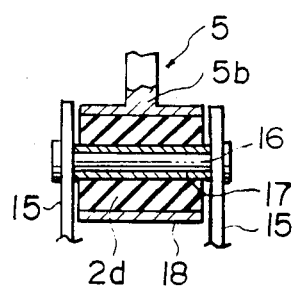
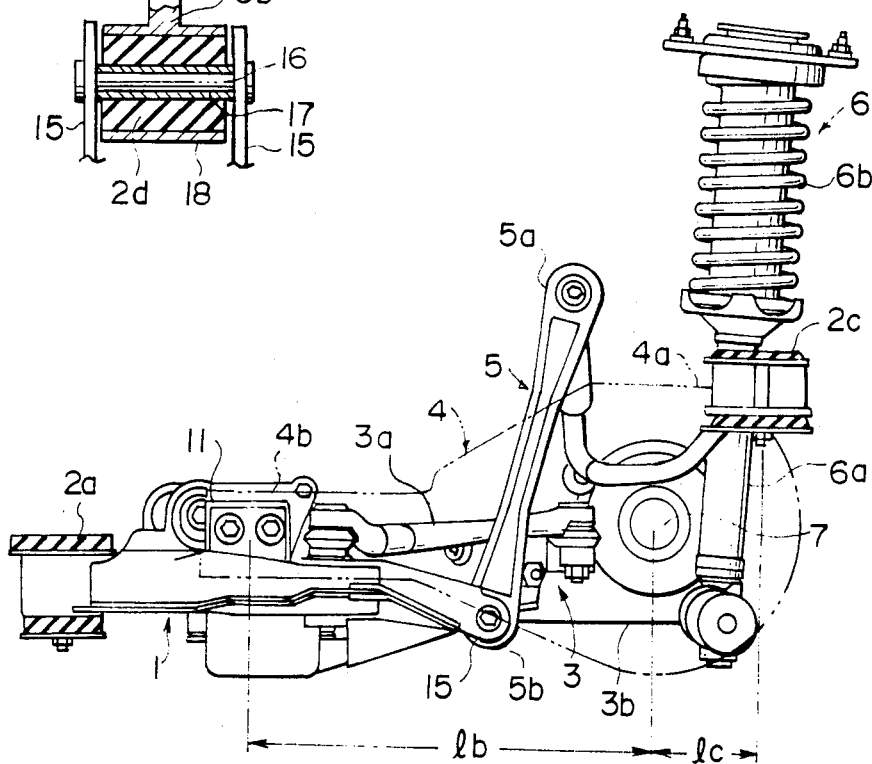

REAR SUSPENSION SYSTEM FOR VEHICLE

BACKGROUND OF THE INVENTION

1. Field of the Invention

This invention relates to a rear suspension system for a vehicle, and more particularly to a mounting structure for mounting a rear suspension system in conjunction with a differential.

2. Description of the Prior Art

Vehicles having a trailing arm type suspension system are generally provided with a suspension mounting frame which extends in the transverse direction of the vehicle body and is supported by the vehicle body at both ends thereof. The trailing arms for supporting the rear wheels are pivoted on the suspension mounting frame. In the case in which the vehicle having such suspension system is of front-engine rear-drive type, the differential is generally disposed at the rear of the suspension mounting frame. As is disclosed in Japanese Unexamined Utility Model Publication No. 57(1982)-90211, there has been known a rear suspension system for a vehicle having a differential at the rear of a suspension mounting frame in which the differential case is supported by the vehicle body at a rear portion thereof and is fixedly connected to an intermediate portion of the suspension mounting frame at a front portion thereof.

However, the conventional rear suspension system has a drawback that vibration of the differential is transmitted to the suspension mounting frame and the trailing arms to adversely affect the suspension system and is further transmitted to the vehicle body by way of the suspension mounting frame since the front portion of the differential case is fixedly connected to the intermediate portion of the suspension mounting frame even if both ends of the suspension mounting frame and the rear portion of the differential case are connected to the vehicle body by way of resilient material bodies.

The vibration of the differential could be prevented from being transmitted to the suspension mounting frame by connecting the front portion of the differential case to the intermediate portion of the suspension mounting frame by way of a resilient material body. However, when the front portion of the differential case and the intermediate portion of the suspension mounting frame are connected to each other by way of a resilient material body, restraint on the position of the intermediate portion of the suspension mounting frame is weakened to permit displacement of the intermediate portion of the suspension mounting frame to some extent. This can produce, together with various causes such as vibration of the differential, pitching of the suspension mounting frame (torsional movement about a horizontal axis passing through the connections of the suspension mounting frame to the vehicle body) which is transmitted to the trailing arms to unsettle the suspension system, thereby lowering the running stability of the vehicle.

Further, it is proposed in Japanese Patent Publication No. 58(1983)-24290 to support the front portion of the differential case by way of a resilient material body on a cross member provided to extend in the transverse direction of the vehicle body separately from the suspension mounting frame. However, in the case of a passenger car having a monocoque body, for instance, it is difficult and undesirable to provide a cross member exclusively for supporting the differential on the underside of the floor.

SUMMARY OF THE INVENTION

In view of the foregoing observations and description, the primary object of the present invention is to provide a rear suspension system in which the front portion of the differential case is connected to the intermediate portion of the suspension mounting frame but which overcomes said drawback inherent to the conventional suspension systems that vibration of the differential is transmitted to the suspension mounting frame and the trailing arms to adversely affect the suspension system and is further transmitted to the vehicle body by way of the suspension mounting frame without sacrificing the running stability.

The rear suspension system in accordance with the present invention comprises a suspension mounting frame which extends in the transverse direction of the vehicle body and is supported on the vehicle body at the right and left ends thereof by way of resilient material bodies, and a pair of trailing arms pivoted on the suspension mounting frame. An intermediate portion of the suspension mounting frame is connected, by way of a resilient material body, to a front portion of a differential case which is connected to the vehicle body at a rear portion by way of a resilient material body. Further, the intermediate portion of the suspension mounting frame is supported by the vehicle body by way of a vertical movement restraining member for restraining vertical movement of the intermediate portion (i.e., pitching of the suspension mounting frame).

BRIEF DESCRIPTION OF THE DRAWINGS

FIG. 1 is a fragmentary plan view of a rear suspension system in accordance with an embodiment of the present invention, FIG. 2 is a front view as viewed in the direction of arrow A in FIG. 1, FIG. 3 is a side view of the rear suspension system of FIG. 1, FIG. 4 is a cross-sectional view taken along line IV—IV in FIG. 1, FIG. 5 is a cross-sectional view taken along line V—V in FIG. 1.

DESCRIPTION OF THE PREFERRED EMBODIMENTS

Figure 6:
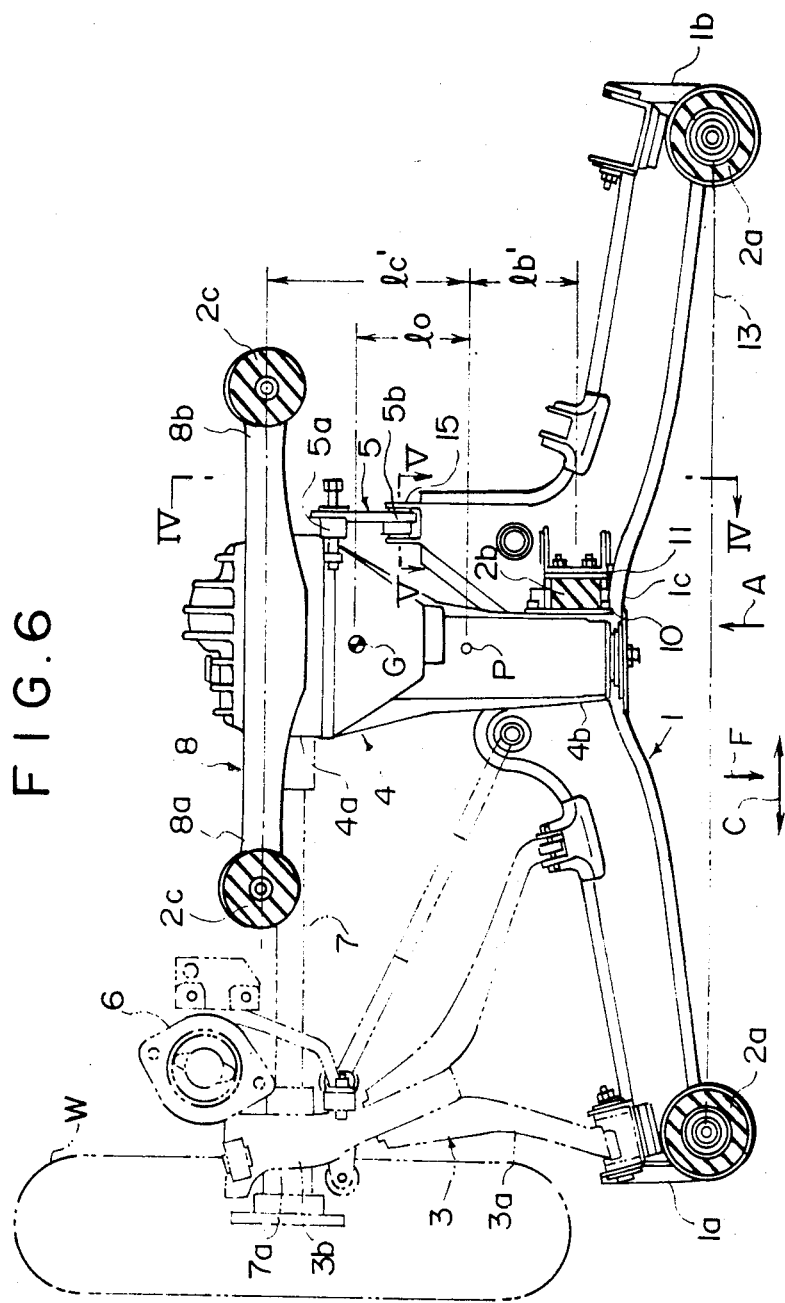
FIG. 6 is a view similar to FIG. 1 but for illustrating a modification of the rear suspension system of FIG. 1.

In FIGS. 1 to 4, a rear suspension system in accordance with an embodiment of the present invention includes a suspension mounting frame 1 extending in the transverse direction (shown by arrow C in FIG. 1, arrow F showing the front direction). The suspension mounting frame 1 is suspended from the floor portion of the vehicle body (not shown) at the left and right (as seen in FIG. 1) end portions 1a and 1b by way of resilient material bodies 2a. To the suspension mounting frame 1 are connected left and right (as seen in FIG. 1) trailing arms 3 (which may be either of full trailing type or semi trailing type) for pivotal movement (only the left trailing arm shown in FIG. 1). A differential case 4 disposed at the rear of the suspension mounting frame 1 is connected to the vehicle body at a rear portion 4a by way of a pair of resilient material bodies 2c. In more particular, the rear portion 4a of the differential case 4 is fixed to a differential mounting frame 8 which is connected to the vehicle body at the right and left end portions by way of the resilient material bodies 2c. The rear end portion 4a of the differential case 4 may be connected to the vehicle body by way of one resilient material body without the differential mounting frame 8 intervening therebetween. On the other hand, the differential case 4 is connected to an intermediate portion 1c of the suspension mounting frame 1 at a front portion 4b by way of a resilient material body 2b. That is, a bracket 10 is fixedly provided on the front portion 4b of the differential case 4 and a bracket 11 is fixedly provided on the intermediate portion 1c of the suspension mounting frame 1, and the brackets 10 and 11 are connected by the resilient material body 2b. The intermediate portion 1c of the suspension mounting frame 1 is connected to the vehicle body by way of a vertical movement restraining rod 5 for restraining up-and-down movements of the intermediate portion 1c of the suspension mounting frame 1. The up-and-down movements of the intermediate portion 1c of the suspension mounting frame 1 includes linear up-and-down movements such as shown by arrow D in FIG. 3 and up-and-down pivotal movements (such as shown by arrow E in FIG. 3) about an imagined horizontal axis 13 passing through the connections of the suspension mounting frame 1 to the vehicle body. The vertical movement restraining rod 5 is pivoted on the vehicle body at the upper end 5a and is connected for pivotal movement to a rearward extension of the suspension mounting frame 1 extending from the intermediate portion 1c of the suspension mounting frame 1 by way of a resilient material body at the lower end 5b as shown in detail in FIG. 5. That is, as shown in FIG. 5, a pair of brackets 15 are fixed to the rearward extension of the suspension mounting frame 1 opposed to each other, while a tubular portion 18 is fixed to the lower end 5b of the vertical movement restraining rod 5. A smaller diameter tubular member 17 is inserted into the tubular portion 18 and resilient material body 2d connects the tubular portion 18 and the tubular member 17. Then a pin 16 is passed through the tubular member 17 and fixed to the corresponding brackets at the both ends.

Each trailing arm 3 comprises an arm portion 3a connected to the suspension mounting frame 1 and a wheel support portion 3b for supporting a wheel W. The wheel support portion 3b is supported by the vehicle body by way of a damper 6 as clearly shown in FIG. 4. The damper 6 comprises a body portion 6a and a coil spring 6b. Each rear axle 7 extending from the differential case 4 is supported by the wheel support portion 3b of the trailing arm 3 near the free end 7a at which the wheel W is mounted thereon.

The resilient material bodies 2a to 2b are for resiliently connecting two components and a well known rubber mount support structure may be used as the resilient material body, though they need not be limited to the structure. The resilient material bodies 2a and 2d for supporting the suspension mounting frame 1 are relatively hard and the resilient material bodies 2c and 2b for supporting the differential case 4 are relatively soft, the reason of which will become apparent later.

In the rear suspension system of this embodiment, vibration of the differential system is prevented from being transmitted to the suspension system to adversely affect the suspension system since the differential case 4 and the suspension mounting frame 1 are connected by way of the resilient material body 2b. Further, vibration of the suspension system due to road noise, for instance, is absorbed by the resilient material body 2b and can be prevented from being transmitted to the differential system. Further, in the case of the rear suspension system of the present invention, pitching of the suspension mounting frame which is transmitted to the trailing arms to unsettle the suspension system, thereby lowering the running stability of the vehicle, can be nevertheless restrained by virtue of the vertical movement restraining rod 5 though the suspension mounting frame 1 and the differential case 4 are connected by way of a resilient material body. Further, the vibration of the differential transmitted to the vehicle body through the suspension mounting frame 1 is reduced absorbed by the resilient material body 2b.

In the above embodiment, the vertical movement restraining member is in the form of a rod connected to the suspension mounting frame 1 by way of a resilient material body at one end and to the vehicle body for pivotal movement at the other end. For example, the vertical movement restraining member may be a rod which is connected to the suspension mounting frame and the vehicle body without a resilient material body intervening therebetween, and is rotatable with respect to at least one of them. However, it is preferred that at least one end of the rod be connected by way of a resilient material body in order to prevent vibration of the suspension from being directly transmitted to the vehicle body.

Further, the vertical movement restraining rod need not be limited to such a rod but may be in various other forms. For example, it may be a damper. When the distance between the suspension mounting frame and the floor is very small, the vertical movement restraining member may simply be a resilient material body. Further, though in the above embodiment, the vertical movement restraining rod is provided only on the right side of the differential case 4, it may be provided on the left side of the same or may be provided on both sides of the same. It is preferred that vertical movement restraining rods be provided on both sides of the differential case 4 so that the torsional rigidities of the right side portion and the left side portion of the suspension mounting frame become equal to each other.

Generally it is preferred that the differential case be supported by relatively soft resilient material bodies in order to effectively attenuate vibration transmitted from the differential case to the vehicle body while it is preferred that the suspension mounting frame be supported by relatively hard resilient material bodies in order to ensure good running stability. However, in the conventional suspension systems wherein the suspension mounting frame and the differential case are fixedly connected, the hardness of the resilient material bodies for supporting the differential case and the same of the resilient material bodies for supporting the suspension mounting frame must make a compromise with each other. On the other hand, in the suspension system of this embodiment, the hardnesses of the resilient material bodies for supporting the differential case and the suspension mounting frame can be freely selected independent from each other.

Further it is generally preferred that the pitching center of the differential case 4 be on the center of the drive shaft (rear axle). When the pitching center is on the center of the drive shaft, the position of the drive shaft is not moved even if the differential case 4 pitches due to wind up upon sudden start, for instance, whereby torque steer can be prevented.

Thus, the hardnesses of the resilient material bodies 2c and 2b respectively supporting the rear and front portions 4a and 4b of the differential case 4 are selected so that the pitching center of the differential case 4 falls as near the center of the drive shaft 7 as possible. That is, it is possible to set the pitching center of the differential case 4 at any desired position by selecting the relative hardnesses of the resilient material bodies 2c and 2b. More particularly, the pitching center of the differential case 4 can be positioned on the center of the drive shaft 7 by selecting the hardness (similar to a spring constant) kc of the resilient material bodies 2c and that kb of the resilient material body 2b to satisfy a formula $$kb \times 1b = kc \times 1c$$

wherein 1b and 1c respectively represent the distance between the drive shaft 7 and the resilient material body 2b and the distance between the drive shaft 7 and the resilient material bodies 2b as shown in FIGS. 1 and 4.

Further, it is also preferred that the pitching center of the differential case 4 be in front of the center of gravity of the differential so that the weight of the differential can be utilized as a mass to restrain wind up of the differential and generation of noise due to vibration of the differential, for instance. FIG. 6 is a view for illustrating the manner of positioning the pitching center of the differential case 4 in front of the center of gravity of the differential. In FIG. 6, G and P respectively denote the center of gravity of the differential and the pitching center of the differential case 4. The pitching center P can be positioned forward from the center of gravity G of the differential by a distance 1a, by selecting the hardness (similar to a spring constant) kc of the resilient material bodies 2c and that kb of the resilient material body 2b to satisfy a formula $$kb \times 1b' = kc \times 1c'$$

wherein 1b' and 1c' respectively represent the distance between the desired pitching center P of the differential center 4 and the center of the resilient material body 2b and the distance between the desired pitching center P and the center of the resilient material bodies 2b as shown in FIG. 6.

Figure 7:
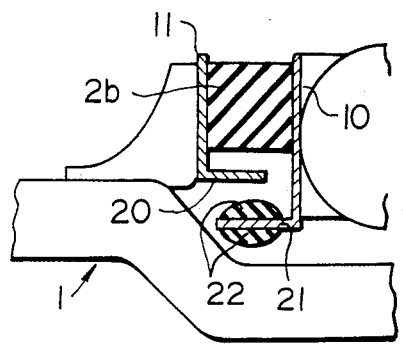
FIG. 7 is an enlarged cross-sectional view taken along line VII—VII in FIG. 1.

As shown in FIGS. 1, 2 and 7, the intermediate portion 1c of the suspension mounting frame 1 is bowed downward to form a recess and the center line C1 of the differential case 4 is offset from the center line C2 of the vehicle body so that the resilient material body 2b is accommodated in the recess. This arrangement is advantageous in that the distance between the suspension mounting frame 1 and the differential case 4 can be shortened. Further, as clearly shown in FIG. 7, the bracket 11 on the suspension mounting frame 1 is provided with a flange portion 20 extending horizontally toward the bracket 10 on the differential case 4. The bracket 10 on the differential case 4 is provided with a stopper portion 21 extending horizontally toward the bracket 11 on the suspension mounting frame 1 between the flange portion 20 thereof and the upper surface of the suspension mounting frame 1 at predetermined distances therefrom. A pair of cushioning rubber bodies 22 are fixed on the upper and lower surfaces of the stopper portion 21.

Thus, the resilient material body 2b absorbs vibration of the differential case 4 by being deformed in shear deformation by which it can be displaced by a larger amount as compared with compression deformation when the differential case 4 vertically vibrates due to fluctuation in the driving force of the engine, for instance, whereby good vibration attenuating effect can be obtained. Further, since the resilient material body 2b is disposed on the side face of the differential case 4, the size of the resilient material body 2 can be freely selected irrespective of the space between the differential case 4 and suspension mounting frame 1.

An abnormally large displacement of the differential case 4 in the vertical direction with respect to the suspension mounting frame 1 is limited by the stopper 21.

Figure 8:
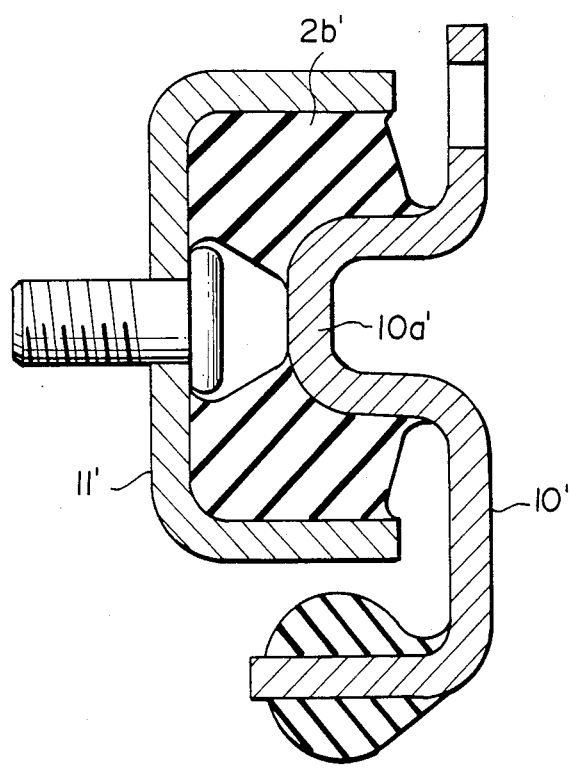
FIG. 8 is an enlarged view showing a modification of the structure for connecting the differential case and the suspension mounting frame.

FIG. 8 shows a modification of the mounting structure of the resilient material body 2b for connecting the differential case 4 and suspension mounting frame 1.

As shown in FIG. 8, in this modification, the bracket 10' provided on the side of the differential case 4 has an outwardly extending projection 10a' at the middle between the upper and lower ends. The bracket 11' provided on the suspension mounting frame 1 is channel-shaped in cross section and is opposed to the projection 10a' of the bracket 10 at a predetermined distance therefrom. The resilient material body 2b' is filled and secured between the channel-shaped bracket 11' and the outer surface of the projection 11a' of the bracket 10. This structure supports the differential case 4 under normal vibration by shear deformation of the resilient material body 2b' and supports the differential case 4 under large vibration by both shear deformation and compression deformation of the resilient material body 2b' to attenuate the vibration.

We claim:

1. A rear suspension system for a vehicle comprising a suspension mounting frame which extends in the transverse direction of the vehicle body and is supported on the vehicle body at the right and left ends thereof by way of first resilient means, and a pair of trailing arms pivoted on the suspension mounting frame characterized in that an intermediate portion of the suspension mounting frame is connected, by way of a second resilient means, to a front portion of a differential case which is connected to the vehicle body at a rear portion by way of a third resilient means and the intermediate portion of the suspension mounting frame is supported by the vehicle body by way of a vertical movement restraining member for restraining vertical movements of the intermediate portion.

2. A rear suspension system as defined in claim 1 in which said vertical movement restraining member comprising a vertically extending rod member which is connected to the vehicle body at the upper end and to the suspension mounting frame at the lower end, at least one of the connections between the rod member and the vehicle body and between the rod member and the suspension mounting frame being made by way of a resilient means.

3. A rear suspension system as defined in claim 2 in which said rod member is connected to the suspension mounting frame at a rearward extension of the suspension mounting frame and by way of a bracket fixed thereto.

4. A rear suspension system as defined in claim 2 in which the center line of said differential case is offset from the center line of the vehicle body and said rod member is disposed on the side of the center line of the vehicle body opposite to the center line of the differential case.

5. A rear suspension system as defined in claim 4 in which said second resilient means is secured between a case bracket provided on the side face of the front portion of the differential case and a frame bracket provided on the suspension mounting frame to be opposed to the case bracket.

6. A rear suspension system as defined in claim 1 in which said first resilient means are relatively hard and said second resilient means is relatively soft.

7. A rear suspension system as defined in claim 6 in which the hardnesses of the second and third resilient means are selected so that the pitching center of the differential case is positioned substantially on the center of the axle extending from the differential case.

8. A rear suspension system as defined in claim 6 in which the hardnesses of the second and third resilient means are selected so that the pitching center of the differential case is positioned in front of the center of gravity of the differential housed in the differential case.

9. A rear suspension system as defined in claim 1 in which said second resilient means is secured between a case bracket provided on the side face of the front portion of the differential case and a frame bracket provided on the suspension mounting frame to be opposed to the case bracket.

10. A rear suspension system as defined in claim 9 in which one of the case bracket and the frame bracket is provided with a projection projecting toward the other bracket at the middle between the upper end and the lower end, and the other bracket is channel-shaped in cross section and is opposed to the projection spaced therefrom.

11. A rear suspension system as defined in claim 9 in which said case bracket is provided, at a lower portion thereof, with a stopper portion which is opposed to the suspension mounting frame at a predetermined distance therefrom.

12. A rear suspension system as defined in claim 9 in which the center line of said differential case is offset from the center line of the vehicle body in the transverse direction of the vehicle body.

* * * * *